(12) United States Patent
Calkin

(10) Patent No.: US 8,230,261 B2
(45) Date of Patent: Jul. 24, 2012

(54) FIELD REPLACEABLE UNIT ACQUITTAL POLICY

(75) Inventor: Howard Calkin, Davis, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 146 days.

(21) Appl. No.: 12/641,043

(22) Filed: Dec. 17, 2009

(65) Prior Publication Data
US 2011/0154114 A1   Jun. 23, 2011

(51) Int. Cl.
G06F 11/00 (2006.01)
(52) U.S. Cl. .......................... 714/26; 714/44
(58) Field of Classification Search .................. None
See application file for complete search history.

(56) References Cited

U.S. PATENT DOCUMENTS

| | | | |
|---|---|---|---|
| 3,928,830 A * | 12/1975 | Bellamy et al. | 714/57 |
| 5,404,503 A * | 4/1995 | Hill et al. | 714/31 |
| 5,544,308 A * | 8/1996 | Giordano et al. | 714/26 |
| 5,561,760 A * | 10/1996 | Ferris et al. | 714/25 |
| 5,922,079 A * | 7/1999 | Booth et al. | 714/26 |
| 7,757,123 B1* | 7/2010 | Gasser et al. | 714/27 |
| 2002/0019870 A1* | 2/2002 | Chirashnya et al. | 709/224 |
| 2002/0111755 A1* | 8/2002 | Valadarsky et al. | 702/58 |
| 2002/0138782 A1* | 9/2002 | Durrant et al. | 714/2 |
| 2004/0153819 A1* | 8/2004 | Bjorsne et al. | 714/37 |
| 2007/0016394 A1* | 1/2007 | Gaudette | 703/19 |
| 2007/0067678 A1* | 3/2007 | Hosek et al. | 714/25 |
| 2007/0074076 A1* | 3/2007 | Imai et al. | 714/26 |

* cited by examiner

Primary Examiner — Gabriel Chu

(57) ABSTRACT

A system and method for managing faults in a computer-based system are disclosed herein. For example, a system includes fault management logic, and a plurality of field replaceable units ("FRUs"). In response to a detected fault in the system, the fault management logic is configured to identify each FRU of a sub-plurality of the FRUs as a possible root cause of the fault. The fault management logic is further configured to store information, including an acquittal policy, that individually specifies for each identified FRU whether to dismiss the identified FRU from the sub-plurality based on detection of an event corresponding to the identified FRU.

17 Claims, 3 Drawing Sheets

FIELD REPLACEABLE UNIT ACQUITTAL POLICY

BACKGROUND

Hardware devices, such as integrated circuits, in server computers and other electronic systems sometimes fail after the systems have been put into service. When a hardware failure occurs, the faulty device must be identified and replaced as quickly as possible to minimize system down time. An electronic system may include diagnostics intended to identify a faulty device. Such diagnostics are often unable to identify a single device as causing a fault detected in the system.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
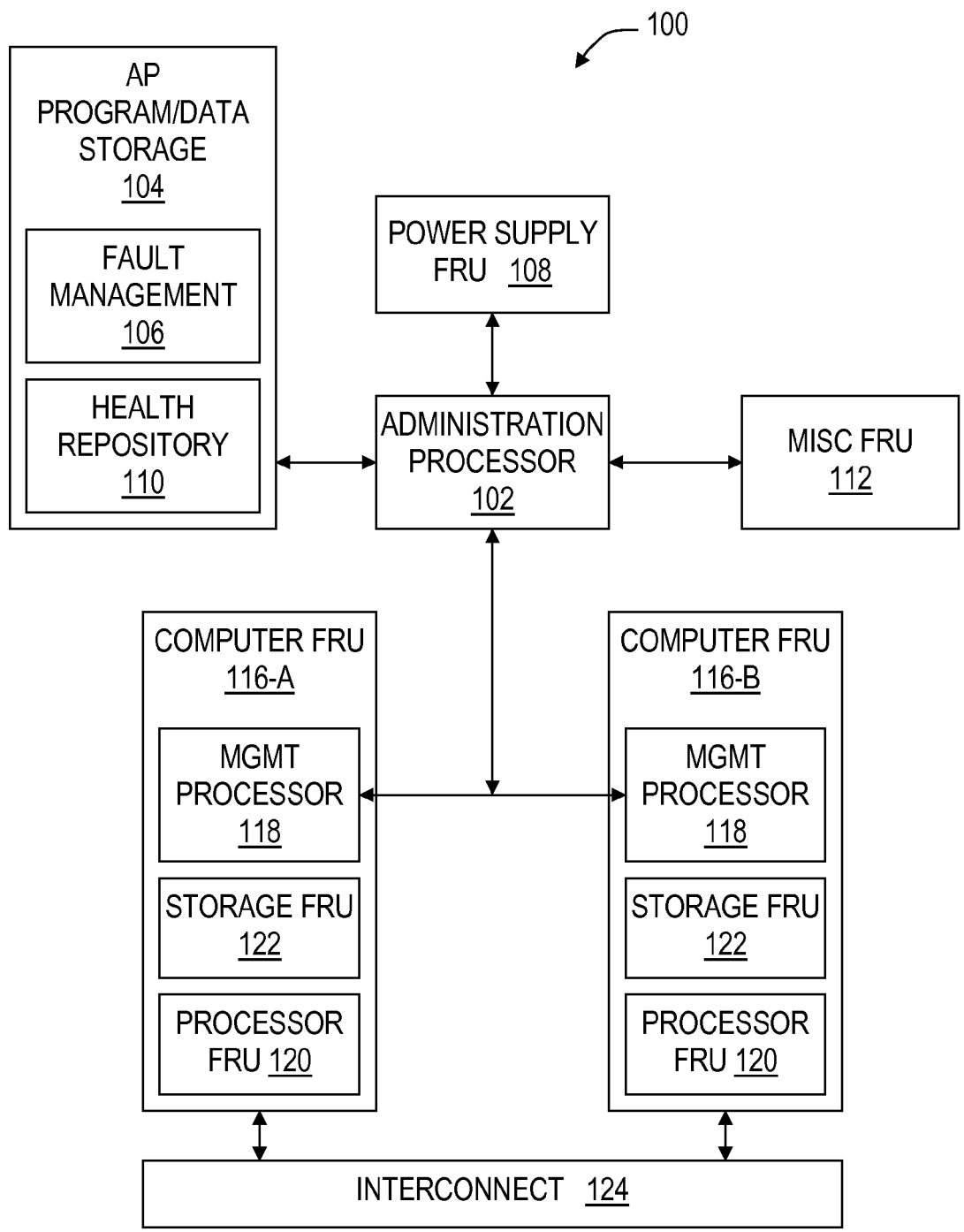
FIG. 1 shows a block diagram of a computer system configured to remove a field replaceable unit ("FRU") from a list of possible causes of a fault detected in the computer system based on an acquittal policy and/or an acquittal linkage of the FRU in accordance with various embodiments.

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection. Further, the term "software" includes any executable code capable of running on a processor, regardless of the media used to store the software. Thus, code stored in memory (e.g., non-volatile memory), and sometimes referred to as "embedded firmware," is included within the definition of software.

A field replaceable unit ("FRU") is a device or assembly that can be replaced at an operating location of a system in which the FRU is installed (i.e., in the field). A FRU can be replaced quickly and easily without transporting an upper level assembly including the FRU to a repair location to perform the replacement.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Computers and other electronic systems often include diagnostics that attempt to determine a root cause of detected fault. When the fault is caused by a hardware malfunction, such diagnostics may be unable to isolate the fault to a single component or field replaceable unit ("FRU"). When multiple FRUs are identified as possible causes of the fault, diagnostics may flag each identified FRU as possibly defective and request service for each identified FRU, and/or reconfigure the system to avoid the identified FRUs (i.e., deconfigure the FRUs).

If each identified FRU is treated as an independent service request or deconfiguration, repair of the defective FRU may leave other flagged FRUs marked defective or deconfigured. Returning the flagged FRUs to service may require manual service.

Embodiments of the present disclosure include a fault management system that provides automatic acquittal of FRUs. The fault management system records, for each FRU identified as a possibly causing a fault, an acquittal policy and an acquittal linkage. The acquittal policy defines the conditions under which the FRU may be returned to service in the system. The acquittal linkage for a given FRU identifies other FRUs that when acquitted may trigger acquittal of the given FRU.

FIG. 1 shows a block diagram of a computer system configured to remove a FRU from a list of possible causes of a fault detected in the computer system based on an acquittal policy and/or an acquittal linkage of the FRU in accordance with various embodiments. The computer system 100 includes an administration processor 102, a fault management module 106, a health repository 110, and various FRUs. The computer system 100 may be a server computer.

A pair of computer FRUs 116-A, 116-B is shown in FIG. 1, but embodiments of the computer 100 may include any number of computer FRUs 116. In some embodiments, a computer FRU 116 is a blade computer. Blade computers are modularized computers configured for installation in a blade enclosure. A blade enclosure may support multiple blade computers, and the computer 100 may include any number of enclosures.

Each computer FRU 116 may include a plurality of components and sub-FRUs. Sub-FRUs are field replaceable components of a higher level FRU. A processor FRU 120 includes one or more system processors configured to execute software programming. The storage FRU 122 is a computer-readable medium and may include volatile or non-volatile semiconductor memory, magnetic storage, or optical storage. A dual in-line memory module is an exemplary storage FRU 122. A portion of storage FRU 122 is accessible to the system processors of the processor FRU 120. Some embodiments of the storage FRU 122 include forward error correction that corrects some faulty data provided from the storage devices included in the storage FRU 122. Software programming executable by the system processors of the processor FRU 120 may be included in the storage FRU 122.

Some embodiments of the computer FRU 116 include a management processor 118. The management processor 118 provides configuration and control services for the computer FRU 116. For example, the management processor 118 may be configured to control selected hardware devices residing on the computer FRU 116.

An administration processor 102, also known as an onboard administrator, provides high-level services to the computer 100. The administration processor 102 provides a point of control for performance of various management tasks, such as configuration of the computer system components, control of computer power and cooling systems, and computer level communication. In some embodiments, the administration processor 102 is coupled to the processor FRUs 116 and other FRUs of the computer system 100 by a dedicated communication link (i.e., a communication link reserved for computer management and control communications), thereby allowing communication between the administration processor 102 and the various FRUs 116, 108, 112, etc. when system level communications are disrupted.

The administration processor 102, the management processor 118 and the processors of the processor FRU 120 may be, for example, general-purpose processors, digital signal processors, microcontrollers, etc. Processor architectures generally include execution units (e.g., fixed point, floating point, integer, etc.), storage (e.g., registers, memory, etc.), instruction decoding, peripherals (e.g., interrupt controllers, timers, direct memory access controllers, etc.), input/output systems (e.g., serial ports, parallel ports, etc.) and various other components and sub-systems.

As mentioned above the administration processor 102 can monitor and control computer system 100 components. The power supply FRU 108, under administration processor 102 control, provides power (e.g., voltage and current) consumed by the computer 100 components. The administration processor 102 monitors the operation of the power supply FRU 108.

Misc FRU 112 represents other FRUs monitored and controlled by the administration processor 102. In some embodiments, the Misc FRU 112 is a thermal control device, for example, a fan. The administration processor 102 can control when and/or at what speed a fan operates to regulate computer system temperature.

The administration processor program/data storage module 104 is a computer-readable medium coupled to the administration processor 102. The storage 102 may be volatile or non-volatile semiconductor memory, magnetic storage, optical storage, etc. Some embodiments of the storage 104 include forward error correction that corrects some faulty data provided from the storage 104. Software programming executable by the administration processor 102 may be included in the storage 104.

The fault management module 106 is stored in the program/data storage 104 for execution by the administration processor 102. The fault management module 106, via the processor 102, provides services related to identifying and correcting hardware faults in the computer system 100. When a fault is detected in the computer 100, (e.g., by fault detection circuitry or by identifying undesirable side effects of the fault) the administration processor 102 retrieves error logs from the computer FRUs 116, and other FRUs 108, 112 and components of the computer 100. All information in the computer 100 that is relevant to the fault is gathered and bundled by the administration processor 102 to form a single consolidated error log. The consolidated error log is provided to the fault management module 106 for processing. The fault management module 106 analyzes the consolidated error log and, based on the analysis, identifies one or more FRUs likely to have caused the detected fault.

The health repository 110 stores status information related to the computer system 100 and the various FRUs (e.g., 116, 108, etc.) and components of the computer 100. When the fault management module 106 identifies potentially malfunctioning FRUs, information indicating that each of the identified FRUs may be a cause of the detected fault is stored in the health repository 110. In some embodiments, the health repository 110 is centralized as shown in FIG. 1. In other embodiments, the health repository 110 is distributed. For example, information regarding the health (i.e., the operational status) of each FRU may be stored on the FRU (e.g., computer FRU 116-A health information may be stored on the computer FRU 116-A).

It may be difficult for the fault management module 106 to isolate a detected fault to a single FRU. For example, if transmission of a data packet from computer FRU 116-A to computer FRU 116-B fails, either of the computer FRUs 116 or the interconnect 124 may have caused the fault. The interconnect 124 represents a variety of components, for example, backplanes, connectors, cables, etc., any of which may have caused the fault. Some of these components, e.g., cables, are FRUs. For each FRU identified as possibly causing the fault, the fault management module 106 stores information in the health repository 110 linking the FRU to the fault and to each other identified FRU. Information identifying a FRU as a likely cause of a fault may be referred to as an "indictment."

The fault management module 106 can provide information regarding indicted FRUs to a user of the computer 100, or to a support entity providing maintenance services for the computer 100. The indictments may be prioritized in accordance with the probability that the indicted FRU is the root cause of the fault.

The fault management module 106 can also reconfigure the computer 100 to avoid potentially faulty hardware (i.e., deconfigure the hardware). For example, if the interconnect 124 includes a cable, and the fault management module 106 identifies the cable as a likely cause of the detected fault, the fault management module 106 may deconfigure transceiver circuits on the computer FRUs 116 to avoid using the cable. The transceiver circuits may also be identified as possible causes of the fault.

Each indictment links the indicted FRU to every other FRU indicted as potentially causing the detected fault. When an indicted FRU is replaced or repaired the indictment against the FRU can be dismissed (i.e., the FRU acquitted; removed from the list of FRUs possibly causing the fault). Furthermore, indictments against other FRUs may also be dismissed. Accordingly, each indictment includes linkage that identifies FRUs that may be acquitted based on dismissal of a different indictment. For example, if computer FRUs 116-A, 116-B and interconnect 124 are indicted as possible causes of a detected fault. Indictment linkage between the FRUs can provide that FRUs 116 are automatically acquitted based on acquittal of the interconnect 124 (e.g., a cable is replaced). However, the linkage may also provide that FRU 116-A is not automatically acquitted if FRU 116-B is acquitted (e.g., FRU 116-B is replaced).

Embodiments may implement the acquittal linkage by including in an indictment a list of other FRUs to be acquitted based on dismissal of the indictment, or by including in an indictment a list of FRUs that when acquitted trigger acquittal of the FRU. Other implementations are readily conceivable, for example, acquittal linked lists, and fault level acquittal lists. The present disclosure encompasses all acquittal linkage embodiments.

Automatic acquittal controlled by acquittal linkage allows the computer 100 to automatically reintegrate previously deconfigured hardware while providing controlled reintegration based on relationships between indicted FRUs.

In addition to the acquittal linkage, the fault management module 106 stores in the health repository 110 an acquittal policy for each indicted FRU. An acquittal policy specifies the conditions under which indicted hardware may be reintegrated into the computer 100 after functionality has been restored. The events signifying that a FRU or other hardware component is suitable for reintegration may depend on the hardware type, physical location of the hardware, the nature of the detected fault, etc. Failure to identify appropriate causes for reintegration can allow reintegration of faulty hardware or prevent reintegration of operable hardware.

The acquittal policy includes a list of events that can be detected by the computer 100 and communicated to the fault management module 106. Examples of such events include a change in FRU identity (e.g., FRU replaced), acquittal request from a user, the FRU is operating properly (e.g., external failure cause removed), hardware latch state change (e.g., indicates FRU replaced or reseated), and hardware insertion event detected.

When generating an acquittal policy for a FRU, the fault management module determines which events are appropriate to trigger reintegration of the FRU. For example, not all FRUs include identity information. Change of identity may not be an appropriate event for reintegration of such a FRU. For some hardware entities, resumption of proper operation may be a suitable reintegration trigger. For example, when it can be established that a malfunction was initiated by an external cause (e.g., an AC/DC converter fails to provide DC power with AC power fails) the FRU will resume proper operation when the external cause of failure is removed. However, if the cause of malfunction is internal, resumption of proper operation may trigger reintegration of an intermittently faulty FRU. The fault management module 106 determines events for inclusion in the acquittal policy of a FRU based on the specific FRU, the type of detected fault, and the fault location (i.e., where the FRU is located within the computer system 100 and where the fault occurred within the FRU.

Figure 2:
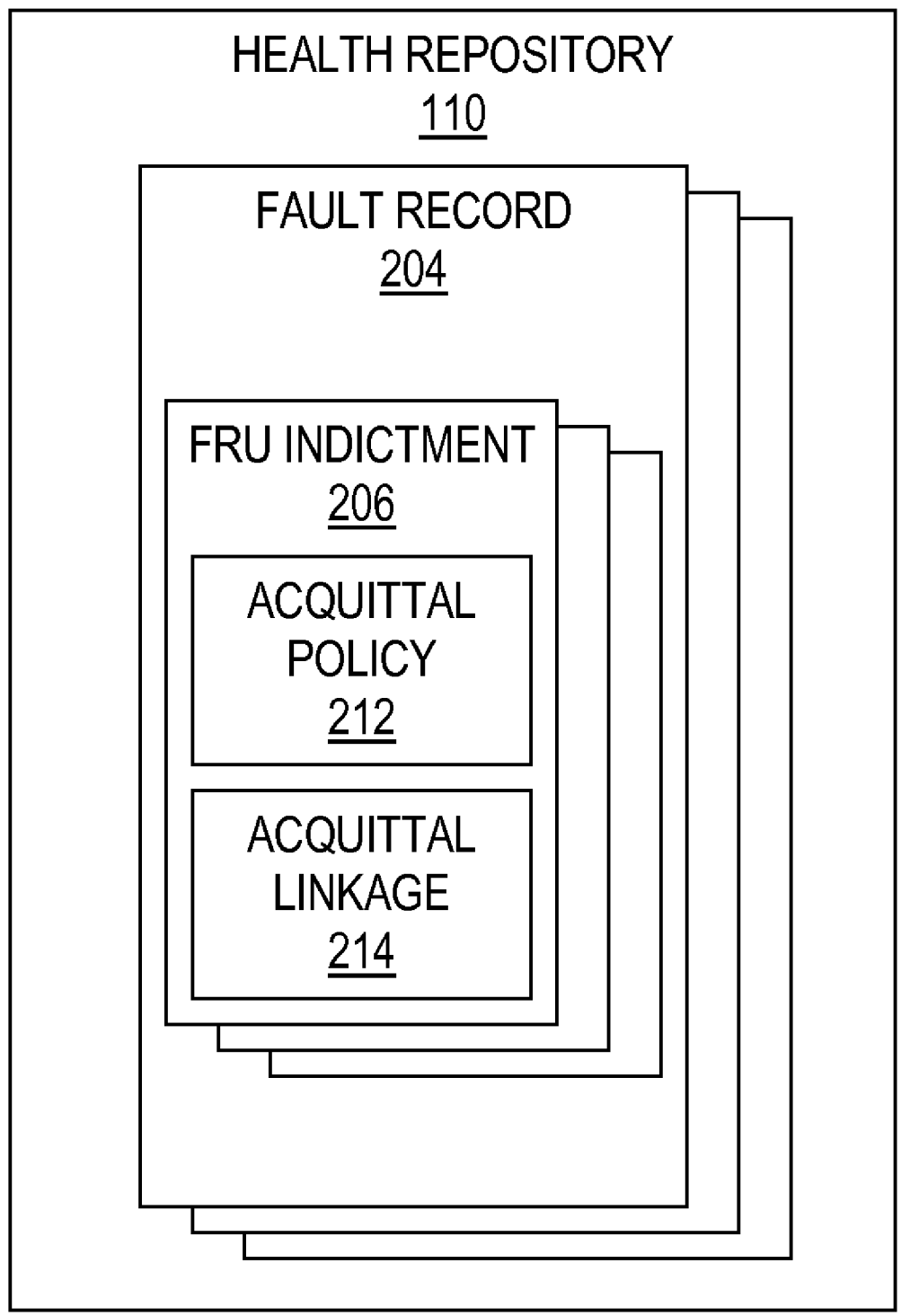
FIG. 2 shows a health repository including an acquittal policy and acquittal linkage for each FRU indictment in accordance with various embodiments.

FIG. 2 shows a health repository including a FRU acquittal policy and acquittal linkage for each FRU indictment in accordance with various embodiments. The health repository 110 is configured to include a plurality of fault records 204. Each fault record 204 corresponds to a fault detected in the computer system 100. A fault record 204 can include a list of FRU indictments 206 each indicating that a specific FRU is a possible cause of the detected fault.

Each FRU indictment 206 can include an acquittal policy 212 applicable to the identified FRU. The acquittal policy 212 specifies the conditions (e.g., a list of events that trigger reintegration of the FRU and/or dismissal of the FRU indictment) under which the FRU may be automatically removed from the list of FRUs indicted with regard to a particular fault. The fault management module 106 determines an acquittal policy for each FRU based on the type of FRU, the type of fault detected, and the fault location.

Each FRU indictment 206 can also include an acquittal linkage 214. The acquittal linkage specifies whether the acquittal of one FRU indictment results in the acquittal of another FRU indictment. If a first FRU indictment is acquitted (e.g., due to replacement of the FRU), the fault management module 106, will examine the acquittal linkages of the FRU indictments 206 and acquit other FRU indictments related via acquittal linkages to the first indicted FRU.

For example, consider a first detected fault that results in indictments against the computer FRU 116-A and the interconnect 124, and a second detected fault that results in indictments against the computer FRU 116-B and interconnect 124. A first acquittal linkage ties the interconnect 124 to the computer FRU 116-A, and a second acquittal linkage ties the interconnect 124 to the computer FRU 116-B. Consequently, acquittal of the computer FRU 116-A results in acquittal of the interconnect 124 only with regard to the first detected fault. Thus, particulars channels (i.e., sub-FRUs) of the interconnect 124 related to the first detected fault may be acquitted based on acquittal of the computer FRU 116-A, while channels related to the second detected fault remain under indictment.

Figure 3:
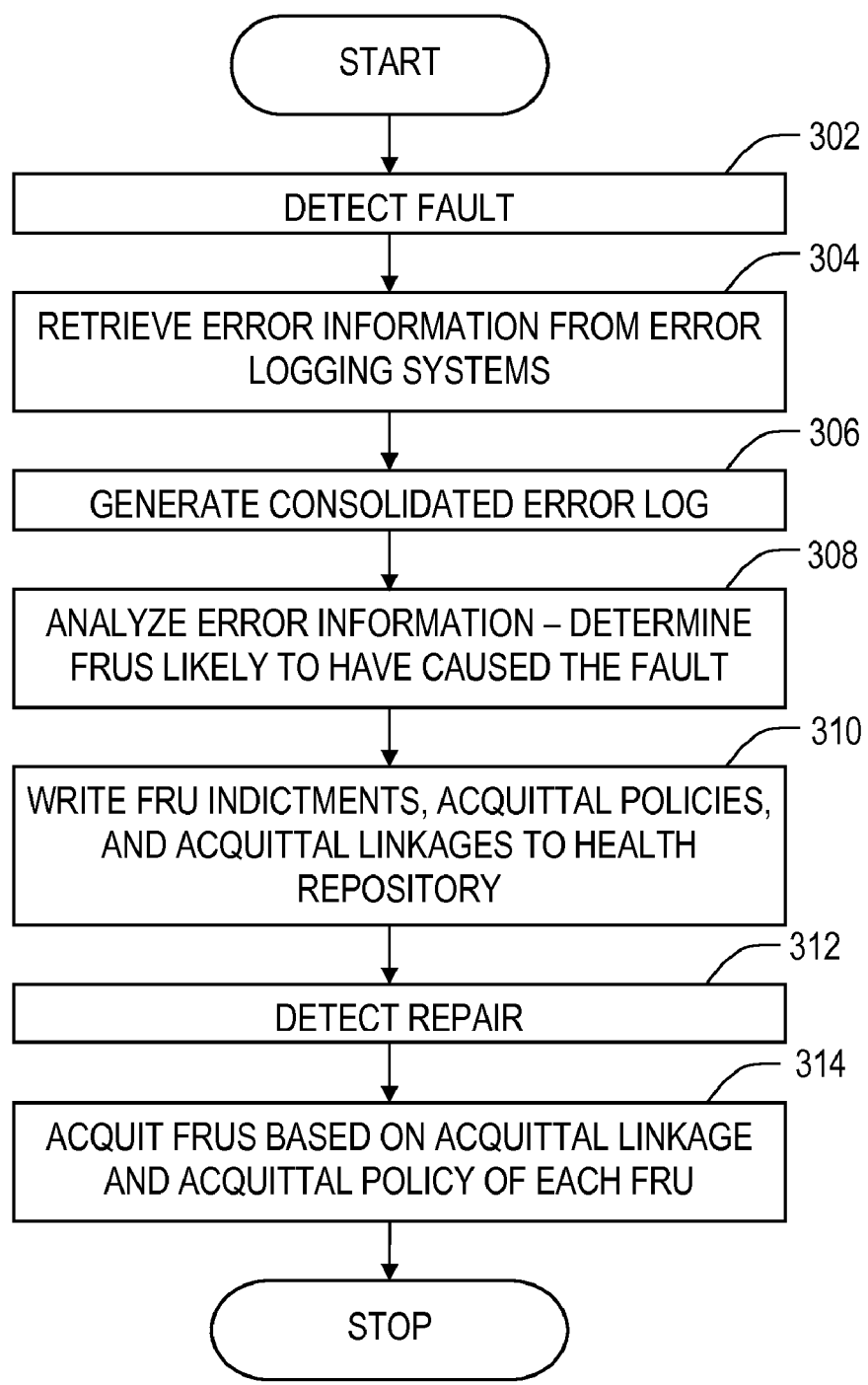
FIG. 3 shows a flow diagram for a method for fault management in a computer system that includes acquitting indicted FRUs based an acquittal policy and acquittal linkage for each indicted FRU in accordance with various embodiments.

FIG. 3 shows a flow diagram for a method for handling faults in a computer system that stores fault information on a FRU selected for replacement in accordance with various embodiments. Though depicted sequentially as a matter of convenience, at least some of the actions shown can be performed in a different order and/or performed in parallel. Additionally, some embodiments may perform only some of the actions shown. In some embodiments, the operations of FIG. 3, as well as other operations described herein, can be implemented as instructions stored in a computer readable medium and executed by a processor.

In block 302, the computer system 100 is operational and performing processing operations. A hardware fault is detected by one or more systems of the computer system 100. A detected hardware fault may include, for example, a memory error or error related to a processor, circuitry, or device of the computer system 100 (e.g., a FRU). A detected fault may be correctable or uncorrectable. Responsive to the fault, error logging systems of the computer system 100 collect error information. Error information may be collected by the processors of the processor FRU 120, management processor 118, administration processor 102, and other computer 100 systems. The error logging systems organize the collected error information into error logs.

In block 304, the administration processor 102 retrieves the collected error information from the various error logging systems. The administration processor 102 bundles the error information to form a consolidated error log that includes all information available in the computer 100 that is relevant to determining a root cause of the detected fault in block 306.

In block 308, the administration processor 102 executes the fault management module 106 to determine which FRUs of the computer system 100 are likely to have caused the fault. The fault management module 106 analyzes the consolidated error log and identifies one or more FRUs as a likely cause of the fault. The fault management module 106 also determines for each identified FRU conditions under which the FRU may be considered not to have caused the fault or to be operating properly (i.e., an acquittal policy 212 for the FRU). The acquittal policy included a list of events related to the FRU that when detected may trigger acquittal of the FRU. The fault management module 106 yet further determines for each identified FRU whether acquittal of a different FRU will cause acquittal the FRU, and generates a list of the different acquittal triggering FRUs (i.e., acquittal linkage 214).

In block 310, the fault management module 106, writes to the health repository 110, FRU indictments 206 specifying the FRUs identified to be possible causes of the fault. The FRU indictments 206 include the acquittal policy 212 and acquittal linkage 214 for each indicted FRU.

In block 312, the computer system 100 detects an event. The event is indicative of a change in the computer system 100 relating to the fault and to an indicted FRU. The event may be, for example, an indicted FRU restored to operative condition, replacement of a FRU, or a user's request to acquit a FRU.

In block 314, the fault management module 106, based on the type of event detected, and on the acquittal policy 212 included in the FRU indictment 206 of a FRU corresponding to the event, determines whether the FRU should be acquitted (i.e., removed from the set of indicted FRUs) with regard to the detected fault. Acquittal of the FRU with regard to the detected fault (i.e., acquittal of the indictment resulting from the detected fault) may not result in acquittal as to any other indictment against the FRU. If the acquittal policy 212 of the FRU indictment 206 indicates that the FRU may be acquitted based on the event, the fault management module 106 may restore the FRU (or a portion of the FRU related to the detected fault) to operation within the computer system 100 and/or remove the FRU from the indictment list for the fault. Based on the acquittal, the fault management module 106 evaluates the FRU linkage 214 of the FRU indictments 206 and determines therefrom which, if any, of the other indicted FRU indictments may also be acquitted.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
   fault management logic; and
   a plurality of field replaceable units ("FRUs");
   wherein the fault management logic is configured to, in response to a detected fault in the system:
      identify each FRU of a sub-plurality of the FRUs as a possible root cause of the fault;
      generate and store information, including an individual acquittal policy, that specifies for each identified FRU whether to dismiss the identified FRU from the sub-plurality based on detection of an event corresponding to the identified FRU;
      wherein the information further includes an acquittal linkage that specifies for each identified FRU whether the FRU is to be dismissed from the sub-plurality based on acquittal of a different identified FRU.

2. The system of claim 1, wherein the information specifies the FRUs of the sub-plurality upon which the acquittal of a given identified FRU is to be based.

3. The system of claim 1, wherein dismissal of a given identified FRU from the sub-plurality causes the given identified FRU to be returned to operation in the system.

4. The system of claim 1, wherein the individual acquittal policy of an identified FRU comprises a list of events upon which a given identified FRU is to be dismissed from the sub-plurality and returned to service by the processor when an event from the list is detected by the processor.

5. The system of claim 4, wherein the list of events comprises events selected from a group consisting of change of FRU identity, request by a user, restoration of the given identified FRU to an operational state, a hardware latch state change, and a hardware insertion event.

6. The system of claim 4, wherein the fault management logic is configured to determine which events compose the list of events for each identified FRU of the sub-plurality based on type of FRU, type of fault detected, location of the FRU in the system, and location of the fault within the FRU.

7. A method, comprising:
   retrieving, by a processor of a computer system, error information from a plurality of error information sources in the computer;
   analyzing, by the processor, the error information to identify a first field replaceable unit ("FRU") of the computer to be a possible cause of a fault from which the error information was derived;
   generating, by the processor, a first acquittal policy for the first FRU comprising a list of one or more events the occurrence of which will cause the processor to eliminate the first FRU as a possible cause of the fault;
   generating information indicating whether the first FRU is to be eliminated as a possible source of the fault based on an acquittal of a different FRU.

8. The method of claim 7, further comprising configuring the first FRU for operation based on the occurrence of an event in the list.

9. The method of claim 7, further comprising:
   identifying a second FRU to be possible causes of the fault; and
   generating, by the processor, a second acquittal policy for the second FRU, the second acquittal policy including a list of one or more events the occurrence of which will cause the processor to eliminate the corresponding FRU as a possible cause of the fault;
   wherein the second acquittal policy is different from the first acquittal policy.

10. The method of claim 7, further comprising generating, by the processor, an acquittal linkage specifying a plurality of FRUs; wherein acquittal of any of the plurality of FRUs as a possible cause of the fault results in acquittal of the first FRU.

11. The method of claim 7, further comprising selecting the events from a group consisting of change of FRU identity, request by a user, restoration of the FRU to an operational state, a hardware latch state change, and a hardware insertion event.

12. The method of claim 7, further comprising selecting the events based on type of the FRU, type of the fault detected, location of the FRU in the computer, and location of the fault within the FRU.

13. A non-transitory computer-readable medium encoded with a computer program comprising:
   instructions that when executed cause a processor of a computer to:
      retrieve error information from a plurality of error information sources in the computer;
      analyze the error information to identify a first field replaceable unit ("FRU") of the computer to be a, possible cause of a fault from which the error information was derived;
      generate a first acquittal policy for the first FRU comprising a list of events the occurrence of which will cause the processor to eliminate the first FRU as a possible cause of the fault;
      generate an indication of whether the first FRU is to be eliminated as a possible source of the fault based on acquittal of the additional FRU.

14. The computer-readable medium of claim 13, further comprising instructions that when executed cause the processor to reintegrate the first FRU into the computer based on the occurrence of an event in the list.

15. The computer-readable medium of claim 13, further comprising instructions that when executed cause the processor to:
   identify an additional FRU to be a possible cause of the fault; and
   generate an additional acquittal policy for the additional FRU, the additional acquittal policy including a list of events the occurrence of which will cause the processor to eliminate the additional FRU as a possible cause of the fault.

16. The computer-readable medium of claim 13, further comprising instructions that when executed cause the processor to generate an acquittal linkage specifying FRUs the acquittal of any of which with regard to the fault results in acquittal of the first FRU.

17. The computer-readable medium of claim 13, further comprising instructions that when executed cause the processor to select the events based on type of the first FRU, type of the fault detected, location of the first FRU in the computer, and location of the fault within the first FRU.

* * * * *

UNITED STATES PATENT AND TRADEMARK OFFICE
CERTIFICATE OF CORRECTION

PATENT NO. : 8,230,261 B2  Page 1 of 1
APPLICATION NO. : 12/641043
DATED : July 24, 2012
INVENTOR(S) : Howard Calkin It is certified that error appears in the above-identified patent and that said Letters Patent is hereby corrected as shown below:

In the Claims

In column 8, line 47, in Claim 13, delete "a," and insert -- a --, therefor.

Signed and Sealed this
Twenty-sixth Day of November, 2013

Margaret A. Focarino
*Commissioner for Patents of the United States Patent and Trademark Office*